United States Patent
Lunsford et al.

(10) Patent No.: US 10,257,424 B2
(45) Date of Patent: Apr. 9, 2019

(54) AUGMENTING FUNCTIONALITY OF A COMPUTING DEVICE

(71) Applicant: Hewlett-Packard Development Company, L.P., Houston, TX (US)

(72) Inventors: Eric Michael Lunsford, Sunnyvale, CA (US); Donald Gonzalez, Redwood City, CA (US); Harri Salomaa, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/500,475

(22) PCT Filed: Jul. 31, 2014

(86) PCT No.: PCT/US2014/049079
§ 371 (c)(1),
(2) Date: Jan. 30, 2017

(87) PCT Pub. No.: WO2016/018347
PCT Pub. Date: Feb. 4, 2016

(65) Prior Publication Data
US 2017/0223277 A1    Aug. 3, 2017

(51) Int. Cl.
*H04N 5/232* (2006.01)
*G06F 3/0481* (2013.01)
*G06F 3/14* (2006.01)

(52) U.S. Cl.
CPC ..... *H04N 5/23293* (2013.01); *G06F 3/04812* (2013.01); *G06F 3/1454* (2013.01); *H04N 5/23216* (2013.01); *H04N 5/23229* (2013.01)

(58) Field of Classification Search
CPC ............ H04N 5/2259; H04N 5/23203; H04N 5/23206; H04N 5/23293; H04N 1/00127; H04N 1/00129; H04N 1/00204–1/00246; G06F 3/1454
See application file for complete search history.

(56) References Cited

U.S. PATENT DOCUMENTS

| 5,801,919 A | 9/1998 | Griencewic |
| 7,599,561 B2 | 10/2009 | Wilson et al. |
| 7,710,391 B2 | 5/2010 | Bell et al. |
| 8,121,640 B2 | 2/2012 | Russ et al. |
| 8,199,117 B2 | 6/2012 | Izadi et al. |
| 8,331,981 B2 | 12/2012 | Lewis |

(Continued)

FOREIGN PATENT DOCUMENTS

WO    WO-2014/037463 A2    3/2014

OTHER PUBLICATIONS

Jared Newman, "How to Turn an Old Phone or Tablet Into a PC Productivity Tool," Mar. 19, 2014, pp. 1-5, PCWorld.

(Continued)

*Primary Examiner* — Paul M Berardesca
(74) *Attorney, Agent, or Firm* — HP Inc. Patent Department (57) ABSTRACT

An image capture system includes a first computing device, a second computing device communicatively coupled to the first computing device, and an imaging device communicatively coupled to the first computing device. An image captured by the imaging device is displayed on the second display of the second computing device.

16 Claims, 6 Drawing Sheets

(56) References Cited

U.S. PATENT DOCUMENTS

| | | |
|---|---|---|
| 8,384,939 B2 | 2/2013 | Patterson |
| 8,736,583 B2 | 5/2014 | Anderson et al. |
| 2002/0186425 A1* | 12/2002 | Dufaux .................. G06K 9/20 |
| | | 358/497 |
| 2010/0104292 A1* | 4/2010 | Na ...................... H04N 5/4403 |
| | | 398/115 |
| 2011/0242054 A1 | 10/2011 | Tsu |
| 2012/0019682 A1 | 1/2012 | Nobels |
| 2012/0282914 A1 | 11/2012 | Lael |
| 2013/0077236 A1 | 3/2013 | Becze et al. |
| 2013/0100497 A1 | 4/2013 | Amiya et al. |
| 2013/0328878 A1* | 12/2013 | Stahl ..................... G06F 3/1431 |
| | | 345/428 |
| 2014/0097248 A1 | 4/2014 | Smith |

OTHER PUBLICATIONS

Shahram Izadi et al., "C-Slate: A Multi-Touch and Object Recognition System for Remote Collaboration using Horizontal Surfaces,", 2007, pp. 3-10, IEEE.

* cited by examiner

AUGMENTING FUNCTIONALITY OF A COMPUTING DEVICE

BACKGROUND

Many users appreciate the ability to work with two or more display devices to allow for easy comparison of documents, to allow easier copy and paste functionality between documents, and when multitasking between software applications. However, adding a number of additional display devices costs money that may not be in an individual's or business's budget. Further, adding a number of additional display devices takes up a large amount of workspace that may not be available in a home or office setting.

In addition, many users would also like to add touchscreen capabilities to a non-touch screen PC display device. However, users are often not willing to upgrade or replace a device at an additional cost in order to obtain touch screen capabilities.

Further, many users would like to scan documents or objects, but their computing system lacks either the functionality to do so or lacks a user-friendly way to scan documents or objects. Scanning devices are often slow, add processing steps to obtain a scan, and cost money. Further, these scanning devices can only scan flat documents and not three-dimensional objects.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

The present systems and methods provide a dual screen system such as a vertical screen of a personal computer and a horizontal screen of, for example, a tablet computer. The horizontal screen is placed on a pad. A swivel camera is provided to allow for the capture of images of objects or documents placed on a horizontal surface. When a user wants to scan a document or object, the user moves the horizontal screen away from the pad, with the tablet still maintaining connectivity and interaction capability with the personal computer. The document or object is placed on the pad where the horizontal screen was originally placed, and the system may scan the document or object. The document or object may then be displayed on the horizontal tablet screen.

The systems and methods provide seamless integration of a tablet computing device with a personal computer for screen mirroring and touchscreen control of the personal computer and elements displayed on the vertical screen. This adds screen real estate to the personal computer while bringing convenient touch screen functions, digital capture of documents and objects, annotation of captured images, increased mobility of the computing platform, and object recognition at a reduced cost to end users. A user desiring to work with two or more monitors to allow for easy comparison of documents, copy-and-paste functionality between documents, and multitasking between applications may benefit from the present systems and methods.

As used in the present specification and in the appended claims, the term "a number of" or similar language is meant to be understood broadly as any positive number comprising 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
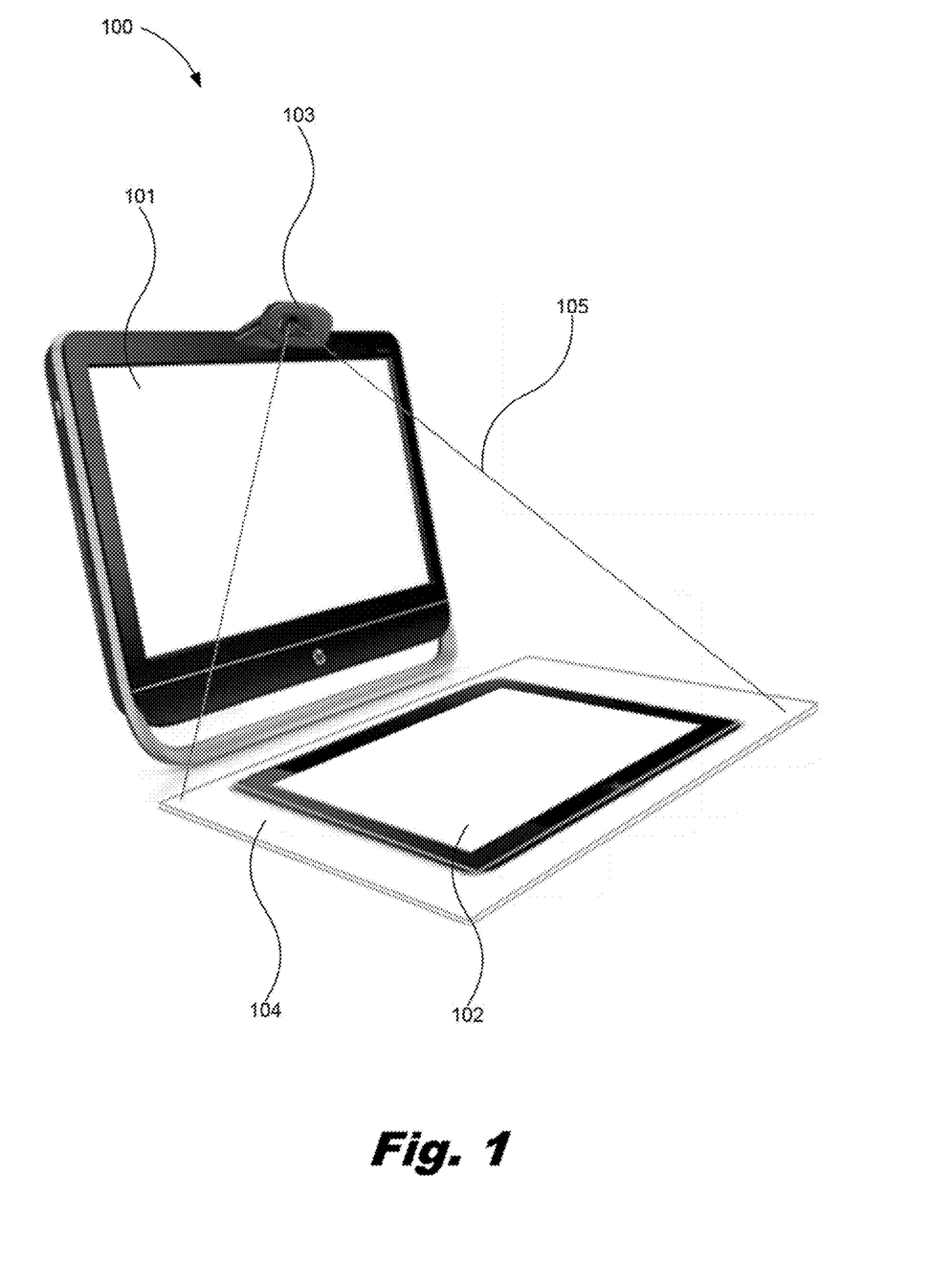
FIG. 1 is a diagram of a system for augmenting functionality of a first computing device, according to one example of the principles described herein.

Turning now to the figures, FIG. 1 is a diagram of a system (100) for augmenting functionality of a first computing device (101), according to one example of the principles described herein. The system (100) comprises a first computing device (101), and second computing device (102), an imaging device (103), and a pad (104). In one example, the first computing device (101) may be a desktop computer, a laptop computer, a mobile device such as a tablet device or a mobile phone device, a personal digital assistant (PDA), an all-in-one computing device, an all-in-one computing device with a touch sensitive screen, among other computing device types. The first computing device (101) may utilize any operating system in including, for example, WINDOWS operating system developed and distributed by Microsoft Corporation; UBUNTU operating system developed and distributed by Canonical Ltd.; UNIX operating system developed by American Telephone and Telegraph Company and distributed as an open source software package; LINUX Unix-based operating system developed and distributed as an open source software package; ANDROID Linux-based operating system developed and distributed by Google, Inc.; BERKELEY SOFTWARE DISTRIBUTION (BSD) Unix-based operating system developed and distributed by the Computer Systems Research Group (CSRG) of the University of California, Berkeley; iOS operating system developed and distributed by Apple Inc.; or Mac OS X operating system developed and distributed by Apple Inc.

The second computing device (102) may be a mobile computing device. In one example, the second computing device (102) may be a computing device already owned by the user that the user then utilizes in connection with the system (100). In this example, the user is not subjected to purchasing additional devices or specialty devices such as projection devices, touch-sensitive interfaces, or user-interactive second computing devices. This greatly reduces costs to the user as consumer, and provides extendable and augmented functionality to the first (101) and second (102) computing devices. The present system (100) also provides a higher resolution image in the display devices of the first (101) and second (102) computing devices than can be achieved in, for example, a projection system.

In one example, the second computing device (102) may be a laptop computing device, a personal digital assistant (PDA), a mobile phone device, a smartphone, and a tablet, among other mobile electronic devices. The second computing device (102) may utilize any operating system in including, for example, IOS (iOS) operating system developed and distributed by Apple, Inc., ANDROID operating system developed and distributed by Google, Inc., or Windows) operating system developed and distributed by Microsoft Corporation, among other operating systems.

In one example, the operating systems of the first computing device (101) and the second computing device (102) are compatible in order to provide the user with the ability to input data or commands to either the first computing device (101) or the second computing device (102), and have those data inputs or commands understood by the compatible operating system of the other device (101, 102). In this example, the first computing device (101) and the second computing device (102) may both be WINDOWS operating system-based devices, for example.

In another example, the operating systems of the first computing device (101) and the second computing device (102) are compatible but not from the same operating system software developing entity. In this example, in order to provide the user with the ability to input data or commands to either the first computing device (101) or the second computing device (102) and have those data inputs or commands understood by the non-compatible operating system of the other device (101, 102), the first computing device (101) and the second computing device (102) comprise computer executed program code to interpret, convert, or process the data inputs and commands received from the operating system of the other device (101, 102).

The imaging device (130) may comprise any device or combination of devices that are capable of capturing the image of a document or object placed on the pad (104). Thus, the imaging device (103) may comprise an image capture device such as a camera or video capture device. In one example, the imaging device (103) is a webcam device. The imaging device (103) is communicatively coupled to the first computing device (101) via a wired or wireless communication link. In one example, the imaging device (105) and the first computing device (101) may communicate, for example, data representing images of objects captured by the imaging device (103), data representing a number of commands entered by the user the first computing device (101) or second computing device (102) to control the imaging device (103), or data representing a request for data from the imaging device (103), among other types of data.

Figure 2:
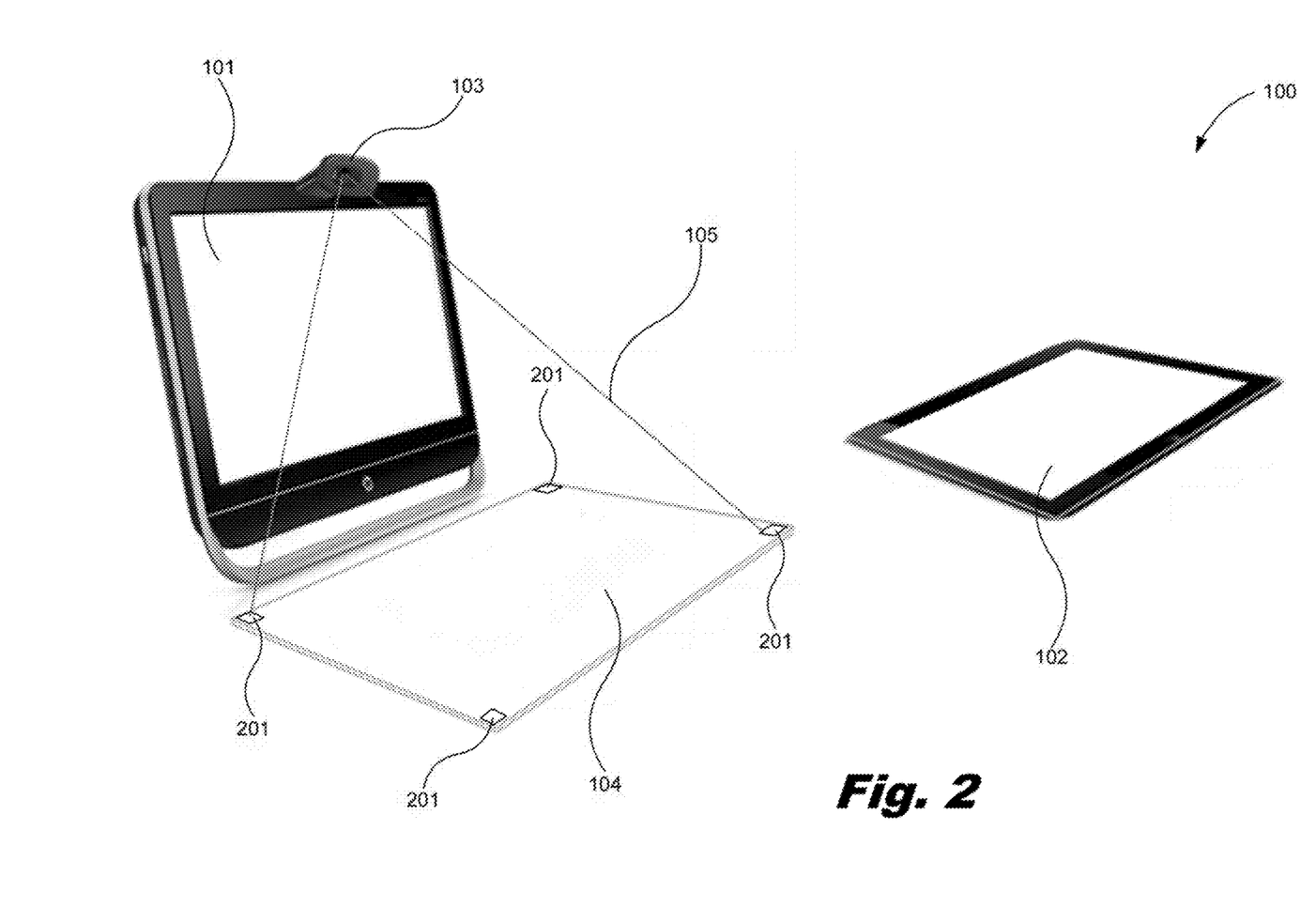
FIG. 2 is a diagram of a system for augmenting functionality of a first computing device, with a second computing device removed from a pad, according to one example of the principles described herein.
Figure 3:
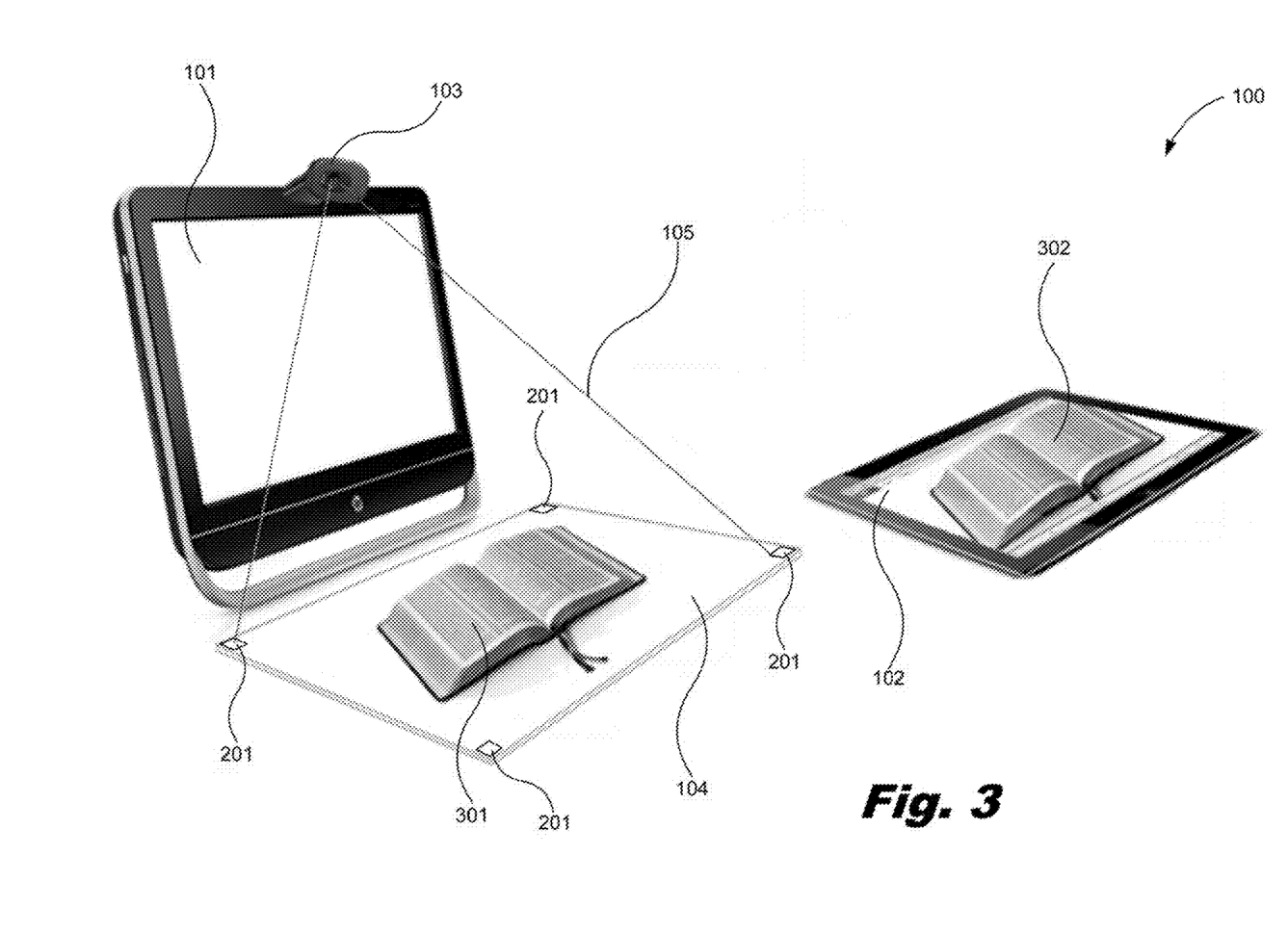
FIG. 3 is a diagram of a system for augmenting functionality of a first computing device with a second computing device removed from a pad and an object placed on the pad for image capture, according to one example of the principles described herein.

Element 105 of FIGS. 1 through 3 depicts a field of image capture provided by the imaging device (103). In one example, the size of the pad (104) may be defined by the field of image capture (105). In another example, the size of the pad (104) may be larger than the field of image capture (105).

The imaging device (103) may be capable of capturing images of varying pixel, special, spectral, and temporal resolutions. Further, the imaging device (103) may swivel in a number of directions. In this manner, the imaging device (103) may be pointed down at the pad (104) in order to capture the image of an object on the pad (104). The imaging device (103) can also be pointed in another direction to capture images of other objects such as the direction of a user positioned in front of the system (100) for video conferencing purposes, for example. In one example, the swiveling or positioning of the imaging device (103) is performed autonomously in which the user may instruct the first (101) or second (102) computing device to direct the imaging device (103) in a specified direction, and the imaging device (103) swivels or repositions itself using servomechanisms or other mechanical devices. In one example, the automatic swivel action may be performed when the second computing device (102) is removed from the pad (104). In this example, a sensor may be located in or around the pad (104) to determine whether the second computing device (102) is located on the pad (104). In another example, the imaging device (103) may be positioned manually by the user.

The pad (104) may comprise any material that may be used to secure the second computing device (102) from moving from a position. The material of the pad (104) may also comprise any material that may be used as a background for image capture by the imaging device (103). For example, the material may be made of a rubber or silicon that comprises a neutral color or a color such as green that assists the image capturing device (103) in distinguishing between the object for which an image is being captured and the background of the object. In this example, the pad (104), acting as a background much like a green screen, may be subtracted from the captured image.

In one example, the pad (104) may include a touch-sensitive interface such as a touch screen. In this example, the pad, may be in communication with the first (101) and second (102) computing devices using any number of wired or wireless communication types as described herein. The pad (104) in this example provides additional functionality to the system (100) by providing additional input and commands to the first (101) and second (102) computing devices. For example, the pad (104) may be used to activate and function the imaging device (103).

In another example, the image capturing device (103) may capture images of objects placed in its vicinity without the use of the pad (104). In this example, the background may be a desk surface or other surface which the processors (401, 501) described below execute code to remove the background from the image.

In still another example, the second computing device (102) may act as a background during image capture by the image capturing device (103). In this example, the second computing device (102) may display a neutral background or other subtractable background during image capture, and the processors (401, 501) described below execute code to remove the background from the image.

The first computing device (101), second computing device (102) and imaging device (103) may use any type of wired or wireless communication in order to communicate with one another. As to wire-based communication examples, the first computing device (101), second computing device (102) and imaging device (103) may use Ethernet cables, fiber optic cables, universal serial bus (USB) cables, or other wired communication types and protocols as identified by, for example, the Institute of Electrical and Electronics Engineers (IEEE). As to wireless-based communication examples, the first computing device (101), second computing device (102) and imaging device (103) may use any type of wireless protocol including BLUETOOTH communication protocols developed by the Bluetooth Special Interest Group, Wi-Fi wireless communication protocols developed by the Wi-Fi Alliance, near field communication protocols, infrared communication protocols, or other wireless communication types and protocols as identified by, for example, the Institute of Electrical and Electronics Engineers (IEEE).

FIG. 2 is a diagram of the system (100) for augmenting functionality of a first computing device (101), with a second computing device (102) removed from a pad (104), according to one example of the principles described herein. As depicted in FIG. 2, the second computing device (102) has been removed from the pad (104) in preparation for the imaging device (103) to capture an image of an object. When removed from the pad (104), the second computing device (102) may maintain communication with the first computing device (101). A number of image registration points (201) may be presented on the pad (104). The image registration points (201) may be used to determine the outer parameters of an image capture zone that the imaging device (103) may use to capture an image of an object. Although the image registration points (201) are depicted in FIG. 2 as square elements printed on the pad (104), the image registration points (201) may have any shape or pattern that assists the imaging device (103) in determining its position relative to the pad (103) and the outer edges of the image capture zone. Further, the image registration points (201) may be printed or presented on the pad (104) using any visible or non-visible ink or pigmentation.

FIG. 3 is a diagram of the system (100) for augmenting functionality of a first computing device (101) with a second computing device (102) removed from the pad (104) and an object (301) placed on the pad (104) for image capture, according to one example of the principles described herein. The object (301) depicted in FIG. 3 is an open book. However, the object may be any object that the user desires to capture an image. The imaging device (103) captures an image of the object (301) on the pad (104) and communicates data representing the object (301) to the first computing device (101). The data representing the captured image of the object (301) may be stored on a data storage device of the first computing device (101), displayed on a display device of the first computing device (101), or transmitted to another computing device such as the second computing device (102).

If the data representing the captured image is sent to the second computing device (102), the second computing device may display the image representing the object on a display device of the second computing device (102). In this manner, a user may distribute data representing the image of the object from the first computing device (101) to the second computing device (102) or a number of second computing devices. The ability to transmit data for consumption by a number of secondary computing devices may be beneficial in scenarios where a number of individuals may need to view the information captured by the imaging device (103) or stored on the first computing device (101). An academic setting may be such a scenario.

Figure 4:
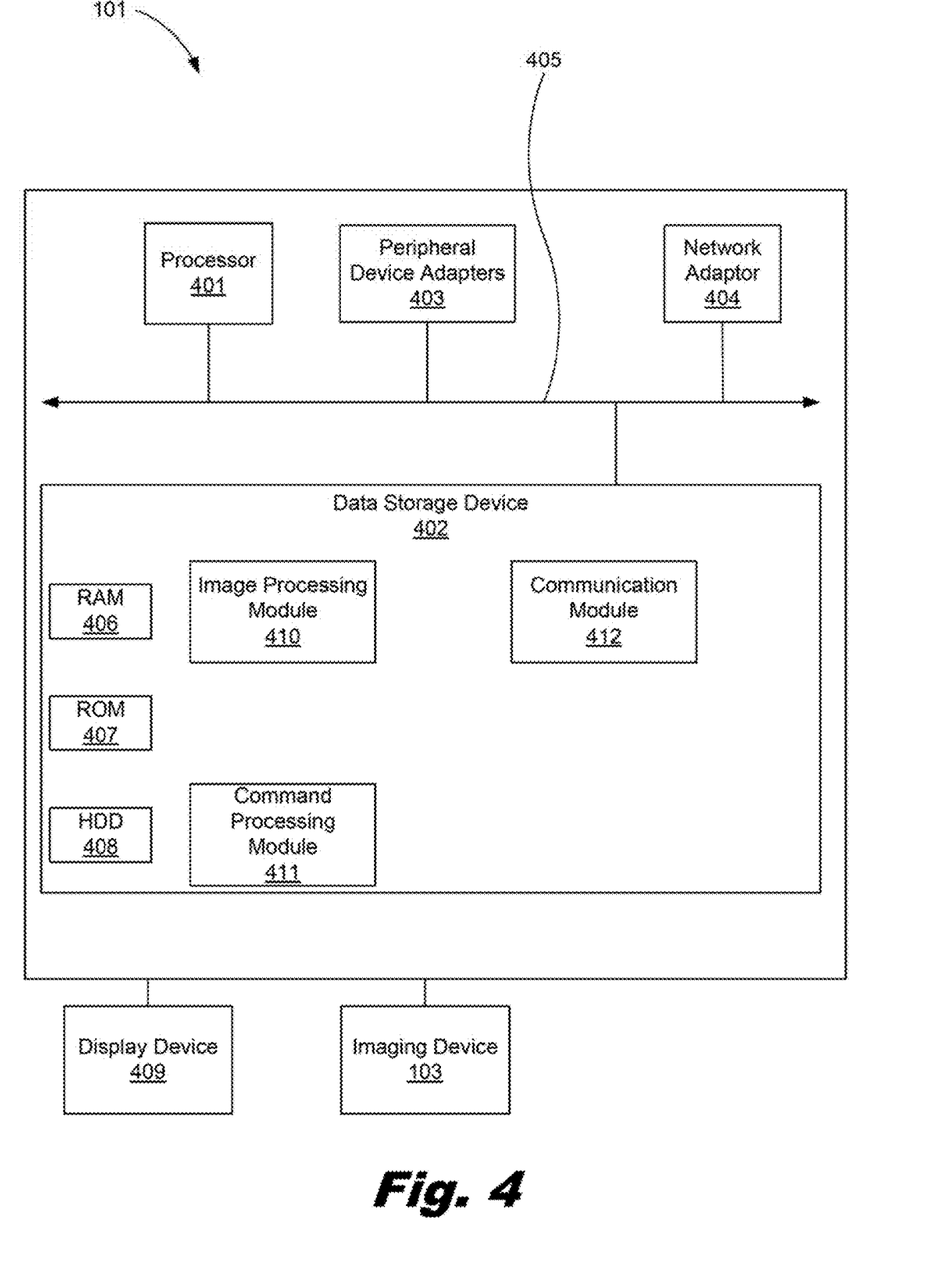
FIG. 4 is a block diagram of the first computing device, according to one example of the principles described herein.

FIG. 4 is a block diagram of the first computing device (101), according to one example of the principles described herein. The first computing device (101) may be implemented in an electronic device. Examples of electronic devices include servers, desktop computers, laptop computers, personal digital assistants (PDAs), mobile devices, smartphones, gaming systems, and tablets, among other electronic devices.

The first computing device (101) may be utilized in any data processing scenario including, stand-alone hardware, mobile applications, through a computing network, or combinations thereof. Further, the first computing device (101) may be used in a computing network, a public cloud network, a private cloud network, a hybrid cloud network, other forms of networks, or combinations thereof. In one example, the methods provided by the first computing device (101) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the first computing device (101) are executed by a local administrator.

To achieve its desired functionality, the first computing device (101) comprises various hardware components. Among these hardware components may be a number of processors (401), a number of data storage devices (402), a number of peripheral device adapters (403), and a number of network adapters (404). These hardware components may be interconnected through the use of a number of busses and/or network connections. In one example, the processor (401), data storage device (402), peripheral device adapters (403), and a network adapter (404) may be communicatively coupled via a bus (405).

The processor (401) may include the hardware architecture to retrieve executable code from the data storage device (402) and execute the executable code. The executable code may, when executed by the processor (401), cause the processor (401) to implement at least the functionality of receiving a number of commands from the second computing device (102), receiving and interpreting a number of touch commands from the second computing device (102), sending a number of touch commands to the second computing device (102), automatically detecting and enabling the best communication type between the first computing device (101) and the second computing device (102), providing data to mirror images displayed on the first computing device (101) onto the second computing device (102), receiving data associated with a number of devices and functionalities not available in the first computing device (101) from the second computing device (102) and utilizing or processing the data on the first computing device (101), and receiving data from the second computing device (102) to control the display of the first computing device (101), among other types of functionality according to the methods of the present specification described herein. In the course of executing code, the processor (401) may receive input from and provide output to a number of the remaining hardware units.

The data storage device (402) may store data such as executable program code that is executed by the processor (401) or other processing device. As will be discussed, the data storage device (402) may specifically store computer code representing a number of applications that the processor (401) executes to implement at least the functionality described herein.

The data storage device (402) may include various types of memory modules, including volatile and nonvolatile memory. For example, the data storage device (402) of the present example includes Random Access Memory (RAM) (406), Read Only Memory (ROM) (407), and Hard Disk Drive (HDD) memory (408). Many other types of memory may also be utilized, and the present specification contemplates the use of many varying type(s) of memory in the data storage device (402) as may suit a particular application of the principles described herein. In certain examples, different types of memory in the data storage device (402) may be used for different data storage needs. For example, in certain examples the processor (401) may boot from Read Only Memory (ROM) (407), maintain nonvolatile storage in the Hard Disk Drive (HDD) memory (408), and execute program code stored in Random Access Memory (RAM) (406).

Generally, the data storage device (402) may comprise a computer readable medium, a computer readable storage medium, or a non-transitory computer readable medium, among others. For example, the data storage device (402) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (403, 404) in the first computing device (101) enable the processor (401) to interface with various other hardware elements, external and internal to the first computing device (101). For example, the peripheral device adapters (403) may provide an interface to input/output devices, such as, for example, display device (409), a mouse, or a keyboard. The peripheral device adapters (403) may also provide access to other external devices such as an external storage device, a number of network devices such as, for example, servers, switches, and routers, client devices, other types of computing devices, and combinations thereof.

The display device (409) may be provided to allow a user of the first computing device (101) to interact with and implement the functionality of the first computing device (101). The peripheral device adapters (403) may also create an interface between the processor (401) and the display device (409), a printer, or other media output devices. The network adapter (404) may provide an interface to other computing devices within, for example, a network, thereby enabling the transmission of data between the first computing device (101) and other devices located within the network.

The first computing device (101) may, when executed by the processor (401), display the number of graphical user interfaces (GUIs) on the display device (409) associated with the executable program code representing the number of applications stored on the data storage device (102). The GUIs may include aspects of the executable code including GUIs that assist a user in switching from an extended desktop with the second computing device (102) to a mirrored desktop with the second computing device (102) and visa versa, and selecting the display device (409) of the first computing device (101) as the controlling touch input device relative to the connected second computing device (102) and visa versa, among other types of controls. Additionally, via making a number of interactive gestures on the GUIs of the display device (409), a user may control functionality of the first computing device (101), the second computing device (102), or combinations thereof. Examples of display devices (409) include a computer screen, a computer touch screen, a laptop screen, a mobile device screen, a personal digital assistant (PDA) screen, a tablet screen, or combinations thereof, among other display devices (409).

The first computing device (101) further comprises a number of modules used in the implementation of the functions described herein. The various modules within the first computing device (101) comprise executable program code that may be executed separately. In this example, the various modules may be stored as separate computer program products. In another example, the various modules within the first computing device (101) may be combined within a number of computer program products; each computer program product comprising a number of the modules.

The first computing device (101) may include an image processing module (410) to, when executed by the processor (401), instruct the imaging device (103) to capture images as still images, video images or both, and transfer data representing the captured images to the first computing device (101), the second computing device (102), another computing device, or combinations thereof. The image processing module (410) may also instruct the imaging device (103) and other elements of the first computing device (101) to store the data representing the captured images in a data storage device such as, for example, the data storage device (402). The image processing module (410) may also, when executed by the processor (401), instruct the first computing system (101) to mirror the image on the second computing device (102), instruct the first computing system (101) to place the image on the second computing device (102) using the second computing device (102) as an extended desktop, operate the positioning of the imaging device (103), and identify the image registration points (201) for image capture purposes, process a captured image to, for example, remove background portions of the image and enhance the image using a number of image enhancement processes, among other functions.

The first computing device (101) may also include a command processing module (411) to, when executed by the processor (401), interpret, convert, or process the data inputs and commands received from the operating system of the second computing device (102). As described above, a user may input data or commands to the second computing device (102), and have those data inputs or commands understood by the first computing device (101). In this manner, a user may use the second computing device (102) to control the functions of the first computing device (101).

The first computing device (101) may also include a communication module (412) to, when executed by the processor (401), determine a communication type for connection between the first computing device (101) and the second computing device (102). The first computing device (101) and second computing device (102) may use any type of wired or wireless communication in order to communicate with one another. As to wire-based communication examples, the first computing device (101) and second computing device (102) may use Ethernet cables, fiber optic cables, universal serial bus (USB) cables, or other wired communication types and protocols as identified by, for example, the institute of Electrical and Electronics Engineers (IEEE). As to wireless-based communication examples, the first computing device (101), second computing device (102) and imaging device (103) may use any type of wireless protocol including BLUETOOTH communication protocols developed by the Bluetooth Special Interest Group, Wi-Fi wireless communication protocols developed by the Wi-Fi Alliance, near field communication protocols, infrared communication protocols, or other wireless communication types and protocols as identified by, for example, the Institute of Electrical and Electronics Engineers (IEEE).

The communication module (412) determines the communication type based on a number of parameters and factors. These parameters and factors may include, for example, distance between the first computing device (101) and the second computing device (102), and the communication capabilities of first computing device (101) and the second computing device (102) such as whether the computing devices (101, 102) can communicate wirelessly, among other factors. In one example, the best communication type may be chosen based on the parameters and factors. In another example, the user may be given an option to choose a different communication type besides what the system (100) identifies as the best communication type.

Figure 5:
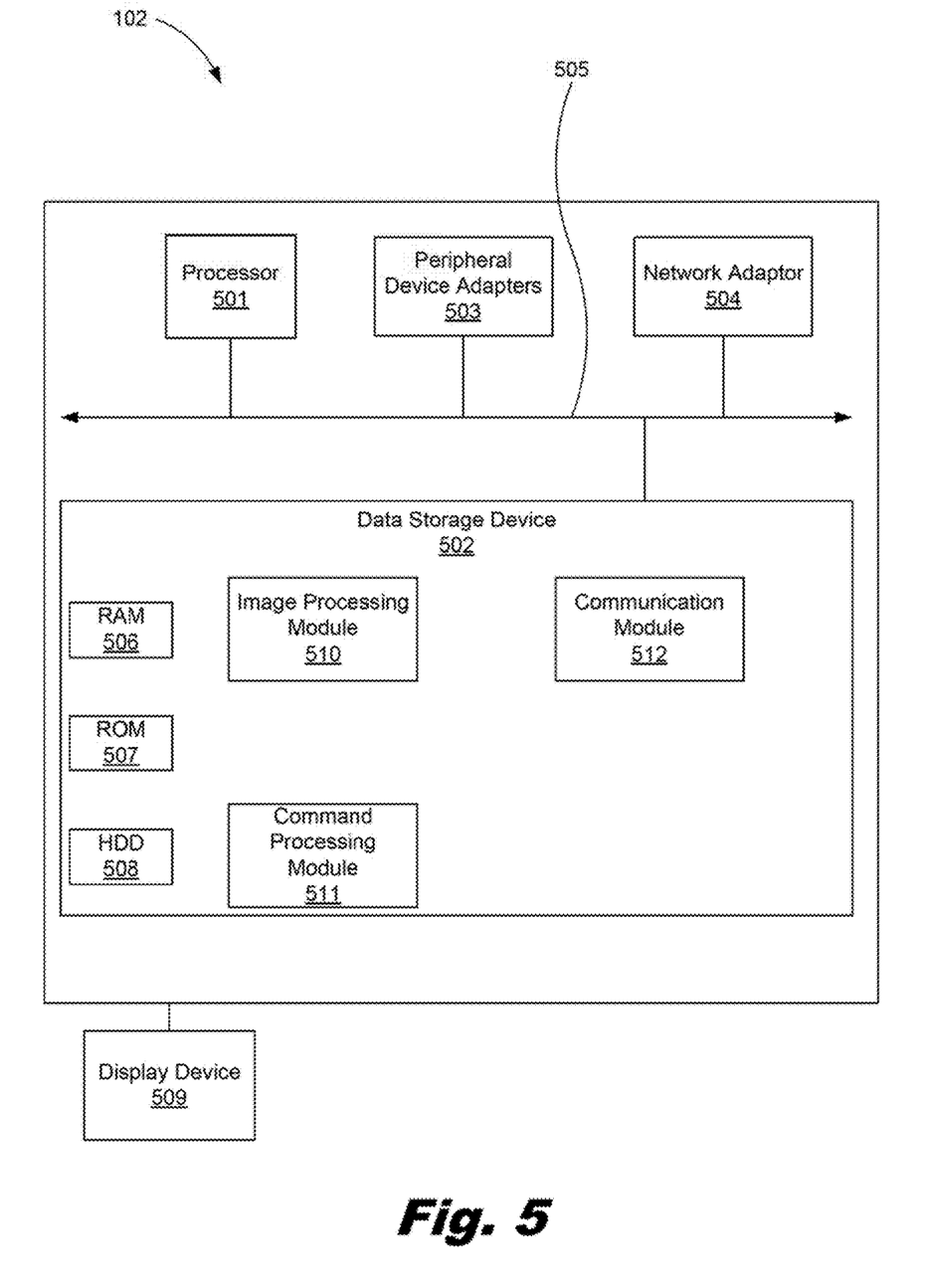
FIG. 5 is a block diagram of the second computing device, according to one example of the principles described herein.

FIG. 5 is a block diagram of the second computing device (102), according to one example of the principles described herein. The second computing device (102) may be implemented in an electronic device. Examples of electronic devices include servers, desktop computers, laptop computers, personal digital assistants (PDAs), mobile devices, smartphones, gaming systems, and tablets, among other electronic devices.

The second computing device (102) may be utilized in any data processing scenario including, stand-alone hardware, mobile applications, through a computing network, or combinations thereof. Further, the second computing device (102) may be used in a computing network, a public cloud network, a private cloud network, a hybrid cloud network, other forms of networks, or combinations thereof. In one example, the methods provided by the second computing device (102) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the second computing device (102) are executed by a local administrator.

To achieve its desired functionality, the second computing device (102) comprises various hardware components. Among these hardware components may be a number of processors (501), a number of data storage devices (502), a number of peripheral device adapters (503), and a number of network adapters (504). These hardware components may be interconnected through the use of a number of busses and/or network connections. In one example, the processor (501), data storage device (502), peripheral device adapters (503), and a network adapter (504) may be communicatively coupled via a bus (505).

The processor (501) may include the hardware architecture to retrieve executable code from the data storage device (502) and execute the executable code. The executable code may, when executed by the processor (501), cause the processor (501) to implement at least the functionality of receiving a number of commands from the first computing device (101), receiving and interpreting a number of touch commands from the first computing device (101), sending a number of touch commands to the first computing device (101), automatically detecting and enabling the best communication type between the second computing device (102) and the first computing device (101), providing data to mirror images displayed on the second computing device (102) onto the first computing device (101), receiving data associated with a number of devices and functionalities not available in the second computing device (102) from the first computing device (101) and utilizing or processing the data on the second computing device (102), and receiving data from the first computing device (101) to control the display of the second computing device (102), among other types of functionality according to the methods of the present specification described herein. In the course of executing code, the processor (501) may receive input from and provide output to a number of the remaining hardware units.

The data storage device (502) may store data such as executable program code that is executed by the processor (501) or other processing device. As will be discussed, the data storage device (502) may specifically store computer code representing a number of applications that the processor (501) executes to implement at least the functionality described herein.

The data storage device (502) may include various types of memory modules, including volatile and nonvolatile memory. For example, the data storage device (502) of the present example includes Random Access Memory (RAM) (506), Read Only Memory (ROM) (507), and Hard Disk Drive (HDD) memory (508). Many other types of memory may also be utilized, and the present specification contemplates the use of many varying type(s) of memory in the data storage device (502) as may suit a particular application of the principles described herein. In certain examples, different types of memory in the data storage device (502) may be used for different data storage needs. For example, in certain examples the processor (501) may boot from Read Only Memory (ROM) (507), maintain nonvolatile storage in the Hard Disk Drive (HDD) memory (508), and execute program code stored in Random Access Memory (RAM) (506).

Generally, the data storage device (502) may comprise a computer readable medium, a computer readable storage medium, or a non-transitory computer readable medium, among others. For example, the data storage device (502) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (503, 504) in the second computing device (102) enable the processor (501) to interface with various other hardware elements, external and internal to the second computing device (102). For example, the peripheral device adapters (503) may provide an interface to input/output devices, such as, for example, display device (509), a mouse, or a keyboard. The peripheral device adapters (503) may also provide access to other external devices such as an external storage device, a number of network devices such as, for example, servers, switches, and routers, client devices, other types of computing devices, and combinations thereof.

The display device (509) may be provided to allow a user of the second computing device (102) to interact with and implement the functionality of the second computing device (102). The peripheral device adapters (503) may also create an interface between the processor (501) and the display device (509), a printer, or other media output devices. The network adapter (504) may provide an interface to other computing devices within, for example, a network, thereby enabling the transmission of data between the second computing device (102) and other devices located within the network.

The second computing device (102) may, when executed by the processor (501), display the number of graphical user interfaces (GUIs) on the display device (509) associated with the executable program code representing the number of applications stored on the data storage device (102). The GUIs may include aspects of the executable code including GUIs that assist a user in switching from an extended desktop with the first computing device (101) to a mirrored desktop with the first computing device (101) and visa versa, and selecting the display device (509) of the second computing device (102) as the controlling touch input device relative to the connected first computing device (101) and visa versa, among other types of controls. Additionally, via making a number of interactive gestures on the GUIs of the display device (509), a user may control functionality of the second computing device (102), the first computing device (101), or combinations thereof. Examples of display devices (509) include a computer screen, a computer touch screen, a laptop screen, a mobile device screen, a personal digital assistant (PDA) screen, a tablet screen, or combinations thereof, among other display devices (509).

The second computing device (102) further comprises a number of modules used in the implementation of the functions described herein. The various modules within the second computing device (102) comprise executable program code that may be executed separately. In this example, the various modules may be stored as separate computer program products. In another example, the various modules within the second computing device (102) may be combined within a number of computer program products; each computer program product comprising a number of the modules.

The second computing device (102) may include an image processing module (510) to, when executed by the processor (501), receive data representing images captured by the imaging device (103). The image processing module (510) may also instruct the imaging device (103) and other elements of the second computing device (102) to store the data representing the captured images in a data storage device such as, for example, the data storage device (502). The image processing module (510) may also, when executed by the processor (501), instruct the second computing device (102) to mirror the image on the first computing device (101), and instruct the second computing system (102) to place the image on the first computing device (101) using the first computing device (101) as an extended desktop, among other functions.

The second computing device (102) may also include a command processing module (511) to, when executed by the processor (501), interpret, convert, or process the data inputs and commands received from the operating system of the first computing device (101). As described above, a user may input data or commands to the second computing device (102), and have those data inputs or commands understood by the first computing device (101). In this manner, a user may use the second computing device (102) to control the functions of the first computing device (101).

The second computing device (102) may also include a communication module (512) to, when executed by the processor (501), determine a communication type for connection between the second computing device (102) and the first computing device (101). As described above, the second computing device (102) and first computing device (101) may use any type of wired or wireless communication in order to communicate with one another. The communication module (512) determines the communication type based on a number of factors. These factors may include, for example, distance between the second computing device (102) and the first computing device (101), and the communication capabilities of second computing device (102) and the first computing device (101) such as whether the computing devices (101, 102) can communicate wirelessly, among other factors.

Figure 6:
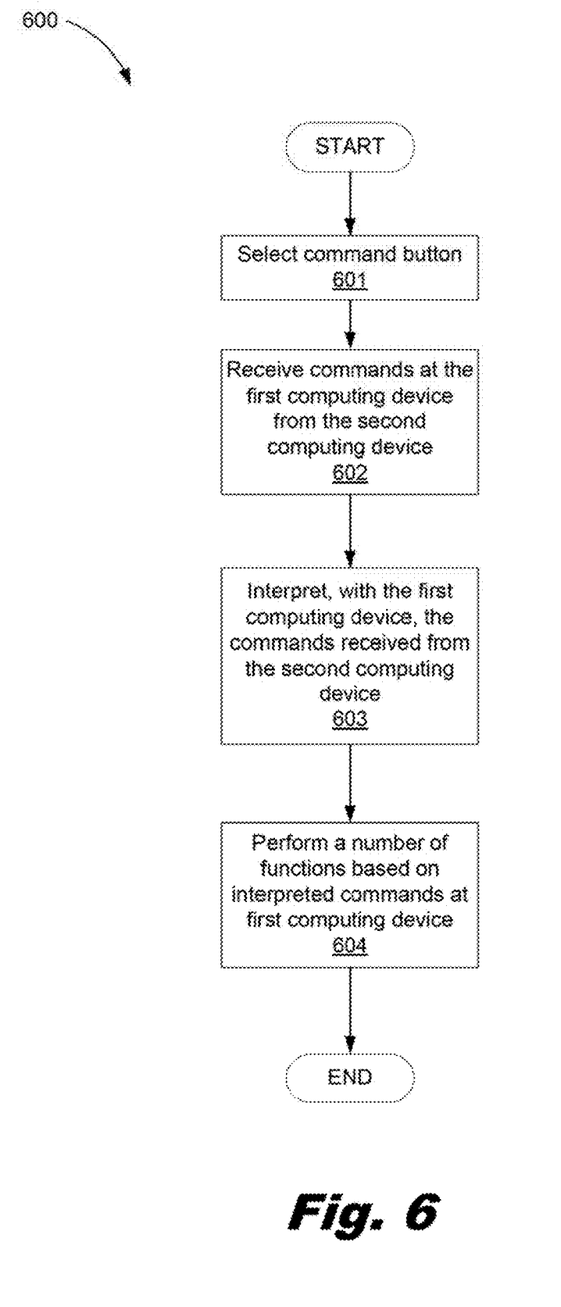
FIG. 6 is a flowchart showing a method of augmenting a first computing device with features of a second computing device, according to one example of the principles described herein.

FIG. 6 is a flowchart showing a method of augmenting the first computing device (101) with features of a second computing device (102), according to one example of the principles described herein. In the example described in connection with FIG. 6, the first computing device (101) is augmented with features of the second computing device (102). However, the method of FIG. 6 applies to augmenting the second computing device (102) with features of a first computing device (101).

Further, in the example of FIG. 6, the first computing device (101) is a desktop computing device with a touch screen that allows the user to control the first computing device (101) through simple or multi-touch gestures by touching the display device (409) of the first computing device (101) with a stylus or one or more fingers. The second computing device (102) in this example is a tablet computing device. The second computing device (102) also comprises a display device (509) that is a touch screen.

The method may begin by selecting (block 601) a command button located on the first (101) or second (102) computing device that allows for commands to be transmitted between the first (101) or second (102) computing device to control one of these devices using the other. In one example, the command button allows for a number of types of interactions including allowing the first computing device (101) to control the second computing device (102), allowing the second computing device (102) to control the first computing device (102), or allowing the first (101) and second (102) computing devices to control each other simultaneously.

The first control device (101) receives (block 602) commands from the second computing device (102). These commands may include, for example commands to access data, commands to input data, commands to store data, commands to activate a number of functions of the first computing device (101), commands to activate functions of a number of peripheral devices connected to the first computing device (101) such as, for example, the imaging device (103), commands to access a number of networks coupled to the first computing device (101) such as, for example, the Internet, and commands to interpret, convert, or process data inputs and commands received at the second computing device (102) that arise from computing functionality available only at the second computing device. An example of commands to interpret, convert, or process data inputs and commands received at the second computing device (102) that arise from computing functionality available only at the second computing device may include, for example, data inputs from devices within or coupled to the second computing device (102) such as, for example, accelerometers, GPS location systems, mobile device carrier network connections, finger print identification devices, credit card reading devices, barometers, pedometers, imaging devices, and heart rate monitors, among other types of devices. In one example, these devices within or coupled to the second computing device (102) may be those found in mobile tablet computing devices or mobile phone devices.

The method (600) may continue with the first computing device (101) interpreting (block 603) the commands received from the second computing device (102). As described above, the command processing module (411) interprets the commands from the second computing device (102). The first computing device (101) performs (block 604) a number of functions based on the interpreted commands.

For example, if one of the commands received from the second computing device (102) includes the capture of an image of an object placed on the pad (104) and mirroring the image onto the second device (102), the first computing device (101), upon receiving (block 602) the commands, interprets (block 603) the commands, and causes the imaging device (103) to swivel down to the pad (104), align with the image registration points (201) of the pad (104), and capture an image of, for example, the open book (301) depicted in FIG. 3. The first computing device (101) then displays the image (302) of the open book (301) on the display device (409) of the first computing device (101), and sends data to the second computing device (102) representing the image (302) of the open book (301), and mirrors the image (302) of the open book (301) on the display device (509) of the second computing device (102). A similar process may be performed in order to create an extended desktop between the first (101) and second (102) computing devices.

In one example, the image (302) of the open book (301) may be stored on the data storage devices (402, 502) of the first (101) and second (102) computing devices. In another example, text within the image (302) of the open book (301) may be subjected to an optical character recognition (OCR) process using the image processing module (FIG. 4, 410) to obtain text from the open book (301). The OCR'ed text may then be stored on the data storage devices (402, 502) of the first (101) and second (102) computing devices. In another example, the stored image (302) may be used in a text-to-speech scenario where the first (101) or second (102) computing devices execute code to obtain the OCR'ed text, and uses a speech synthesizer to convert text into audible speech.

In another example, if one of the commands received from the second computing device (102) includes the processing and displaying of data from, for example, a GPS device of the second computing device, the first computing device (101), upon receiving (block 602) the commands, interprets (block 603) the commands and GPS data, and causes the GPS data to be displayed on the display device (409) of the first computing device (101).

In still another example, the user may desire to mirror an application available on the second computing device (102) onto the display device (409) of the first computing device. In this example, commands are received (block 602) from the second computing device (102) at the first computing device (101) to interpret and display the application running on the second computing device (102). The processor (401) of the first computing device (101) executes the command processing module (411) to interpret (block 603) the commands. The first computing device (101) then performs (block 604) a number of functions based on the interpreted commands at the first computing device (604) by displaying the application on the display device (409) of the first computing device (101).

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (401) of the first computing device (101), the processor (501) of the second computing device (102), or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a computing system includes a first computing device, the first computing device comprising a first display device, and a second computing device communicatively coupled to the first computing device. The second computing device is a tablet computing device comprising a second display device. A number of functions of the second computing device are operable on the first computing device. An image capture system includes a first computing device, a second computing device communicatively coupled to the first computing device, and an imaging device communicatively coupled to the first computing device. An image captured by the imaging device is displayed on the second display of the second computing device. This augmentation of the functionality of a computing device may have a number of advantages, including: (1) providing augmentation of the functionality of computing devices within the system (100), (2) reducing costs in additional hardware to a user while providing increased functionality, and (3) reduces physical space that may be required by other systems, among other advantages.

The preceding description has been presented to illustrate and describe examples of the principles described. This description is not intended to be exhaustive or to limit these principles to any precise form disclosed. Many modifications and variations are possible in light of the above teaching.

What is claimed is:

1. A computing system, comprising:
a first computing device, the first computing device comprising a first display device;
a second computing device communicatively coupled to the first computing device, the second computing device comprising a tablet computing device comprising a second display device; and
a camera communicatively coupled to the first computing device;
a pad to create a neutral background for image capture; and
an image processing module to, when executed by a processor of the first computing device, process an image captured by the camera by identifying a number of image registration points and remove portions of the image including the pad based on the identification of the image registration points,
in which the camera is positionable to be directed at a user of the first computing device or to be directed at a pad to capture images of a number of objects placed on the pad,
in which a number of functions of the first computing device are augmented such that functions of the second computing device are operable on the first computing device, and
in which the image registration points define parameters of an image capture zone.

2. The computing system of claim 1, in which a number of functions of the first computing device are operable on the second computing device.

3. The computing system of claim 1, in which the second display device of the second computing device functions as an extended screen of the first computing device.

4. The computing system of claim 1, in which the second display device of the second computing device is mirrored to the first display device of the first computing device.

5. The computing system of claim 1, in which the first display device of the first computing device is mirrored to the second display device of the second computing device.

6. The computing system of claim 1, in which the neutral background comprises a color; in which the color is subtracted from a captured image.

7. The computing system of claim 1, wherein the image processing module obtains text from the images of the objects obtained by the camera.

8. An image capture system comprising:
a first computing device;
a second computing device communicatively coupled to the first computing device;
an imaging device communicatively coupled to the first computing device,
in which an image captured by the imaging device is displayed on a second display of the second computing device;
a pad to create a neutral background for image capture, in which the pad comprises a number of image registration points to define parameters of an image capture zone;
an image processing module to, when executed by a processor of the image capture system, process the captured image by identifying the image registration points and remove portions of the image including the pad.

9. The image capturing system of claim 8, further comprising:
in which the neutral background is subtractable frog an image of an object captured by the imaging device.

10. A non-transitory computer program product for wirelessly communicating between computing devices, the computer program product comprising:
a computer readable storage medium comprising computer usable program code embodied therewith, the computer usable program code to, when executed by a processor:
determine a communication type for connection between a first computing device and a second computing device; and
prompt a user to select mirroring of a first display device of a first computing device on a second display of a second computing device;
process an image captured by a camera communicatively coupled to the first computing device by identifying a number of image registration points included on a pad that define parameters of an image capture zone and remove portions of the image including the pad based on the identification of the number of image registration points included on the pad that define parameters of the image capture zone.

11. The non-transitory computer program product of claim 10, in which the computer usable program code to, when executed by the processor, determine the communication type for connection between the first computing device and the second computing device based on a number of criteria; further comprises, computer usable program code to, when executed by a processor:
present a number of communication types for connection between the first computing device and the second computing device;
identify a best communication type, the best communication type being based on a number of criteria; and
prompt a user to select a communication type from among the number of communication types.

12. The non-transitory computer program product of claim 10, in which the computer usable program code to, when executed by a processor, prompt the user to select mirroring of the first display device of the first computing device on the second display of the second computing device further comprises computer usable program code to, when executed by a processor:
prompt a user to select mirroring of an image captured by an image capture device of the first computing device on the second display of the second computing device.

13. The image capturing system of claim 8, comprising a command processing module to, when executed by the processor, process a number of functions of commands entered at the second computing device as operable on the first computing device.

14. The computer program product of claim 10, comprising computer usable program code to, when executed by the processor, process a number of functions of commands entered at the second computing device as operable on the first computing device.

15. The non-transitory computer program product of claim 10, comprising computer usable program code to, when executed by the processor, interpret, with the first computing device, commands received at the second computing device.

16. The non-transitory computer program product of claim 10, comprising computer usable program code to, when executed by the processor, interpret, with the second computing device, commands received at the first computing device.

* * * * *

UNITED STATES PATENT AND TRADEMARK OFFICE
CERTIFICATE OF CORRECTION

PATENT NO. : 10,257,424 B2
APPLICATION NO. : 15/500475
DATED : April 9, 2019
INVENTOR(S) : Eric Michael Lunsford et al.

Page 1 of 1

It is certified that error appears in the above-identified patent and that said Letters Patent is hereby corrected as shown below:

In the Claims

In Column 15, Line 57, Claim 6, delete "color;" and insert -- color, --, therefor.

In Column 16, Line 15, Claim 9, delete "frog" and insert -- from --, therefor.

Signed and Sealed this
Thirtieth Day of July, 2019

Andrei Iancu
*Director of the United States Patent and Trademark Office*